US012728548B2

(12) United States Patent
Liu

(10) Patent No.: US 12,728,548 B2
(45) Date of Patent: Sep. 8, 2026

(54) ROBOT LIMB STRUCTURE AND ROBOT

(71) Applicant: Beijing Youzhuju Network Technology Co., Ltd., Beijing (CN)

(72) Inventor: Yunfei Liu, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/038,402

(22) Filed: Jan. 27, 2025

(65) Prior Publication Data

US 2025/0381683 A1 Dec. 18, 2025

(30) Foreign Application Priority Data

Jun. 14, 2024 (CN) ......................... 202410773757.8

(51) Int. Cl.
*B25J 18/02* (2006.01)
*B25J 9/00* (2006.01)
*B25J 17/00* (2006.01)
*B62D 57/032* (2006.01)

(52) U.S. Cl.
CPC ........... *B25J 18/025* (2013.01); *B25J 9/0045* (2013.01); *B25J 17/00* (2013.01); *B62D 57/032* (2013.01)

(58) Field of Classification Search
CPC ........ B25J 18/025; B25J 9/0045; B25J 17/00; B62D 57/032
See application file for complete search history.

(56) References Cited

U.S. PATENT DOCUMENTS 6,832,131 B2 * 12/2004 Hattori ................. B62D 57/032 318/568.22
10,828,787 B2 * 11/2020 Kamon .................... B25J 17/00

FOREIGN PATENT DOCUMENTS

CN 102060059 A 5/2011
CN 117022494 A 11/2023
CN 117341859 A * 1/2024 ........... B62D 57/032

OTHER PUBLICATIONS

Translation CN-117341859-A (Year: 2024).*

* cited by examiner

*Primary Examiner* — Terence Boes
(74) *Attorney, Agent, or Firm* — Alleman Hall LLP

(57) ABSTRACT

The present disclosure provides a robot limb structure and a robot. The limb structure includes: a main limb body, where the main limb body is provided with two joint-connection parts respectively at two ends; two joint components, where the two joint components are connected to the two joint-connection parts, respectively, and each joint component forms a connecting rod mechanism with a joint-connection part corresponding to each joint component; and two telescopic parts, which are provided corresponding to the two joint-connection parts, where one end of each telescopic part is hinged to a joint component of the two joint components, and the other end of each telescopic part is hinged to the main limb body, and a length of each telescopic part is adjustable so as to drive a connecting rod mechanism connected to each telescopic part to move.

18 Claims, 7 Drawing Sheets

ROBOT LIMB STRUCTURE AND ROBOT

CROSS-REFERENCE TO RELATED APPLICATION

The present application claims the priority to and benefits of the Chinese Patent Application No. 202410773757.8, which was filed on Jun. 14, 2024, the entire disclosure of which is incorporated herein by reference as portion of the present application.

TECHNICAL FIELD

The present disclosure relates to a robot limb structure and a robot.

BACKGROUND

Humanoid robots have a wide range of applications. Although the limb structure design of the humanoid robots disclosed in related technology is relatively simple, the action it can mimic are limited. There are also some humanoid robots of which limbs can mimic more actions, but their limb structure design is complex. How to have both is one of the directions of modern robot improvement.

SUMMARY

The present disclosure aims to solve at least one of the technical problems existing in the related art. The present disclosure provides a robot limb structure and a robot having the same. The structure is relatively simple but capable of mimicking a wide variety of actions.

The robot limb structure according to the embodiments of the present disclosure, including: a main limb body, where the main limb body is provided with two joint-connection parts respectively at two ends; two joint components, wherein the two joint components are connected to the two joint-connection parts respectively, and each joint component forms a connecting rod mechanism with a joint-connection part corresponding to each joint component; and two telescopic parts, which are provided corresponding to the two joint-connection parts, where one end of each telescopic part is hinged to a joint component of the two joint components, and the other end of each telescopic part is hinged to the main limb body, and a length of each telescopic part is adjustable so as to drive a connecting rod mechanism connected to each telescopic part to move.

In some embodiments, at least one of the two telescopic parts includes at least two telescopic bodies which are parallel and consistent in length.

Specifically, the telescopic part includes two telescopic bodies which are symmetrically provided on two sides of the main limb body, and each of the two telescopic bodies is connected to the main limb body through a connector.

Optionally, the connector is a spherical hinge.

In some embodiments, each joint-connection part of the two joint-connection parts includes a first hinge point and a second hinge point which are provided on the main limb body at an interval, and a third hinge point is further provided on the main limb body;

the joint component includes: a first connecting rod, a second connecting rod and a third connecting rod; one end of the first connecting rod is connected to the first hinge point, one end of the second connecting rod is connected to the second hinge point, two ends of the third connecting rod are hinged to the first connecting rod and the second connecting rod respectively; a point where the second connecting rod and the third connecting rod are hinged is a fourth hinge point; and one end of a telescopic part corresponding to each joint-connection part is connected to the fourth hinge point, and the other end of the telescopic part is connected to the third hinge point.

Specifically, the main limb body includes: a main limb section, where each of the two ends of the main limb section is provided with an assembling hole to form the third hinge point; two branch limb sections, where first ends of the two branch limb sections are connected to the two ends of the main limb section, second ends of the two branch limb sections are positioned on two opposite sides of the main limb section, each branch limb section of the two branch limb sections is provided with two assembling holes to form the first hinge point and the second hinge point, respectively; and where one end of each telescopic part is connected to a third hinge point adjacent to one branch limb section of the two branch limb sections, and the other end of each telescopic part is connected to a joint component connected to the other branch limb section of the two branch limb sections.

Further, the joint component includes two rotating rods; the two rotating rods are assembled in the two assembling holes of the branch limb section; the first connecting rod and the second connecting rod are connected to ends of the two rotating rods respectively;

where a first limiting hole is radially provided in each assembling hole of the branch limb section; and a first limiting pin is assembled at the first limiting hole to limit a rotating rod in each assembling hole.

Further, a reinforcing rib is arranged between the main limb section and at least one of the two branch limb sections.

In some embodiments, the telescopic part includes a linear motor, and the linear motor includes: a housing; an output shaft which is provided in the housing, where one end of the output shaft extends out of the housing; a stator which is positioned in the housing and sleeves the output shaft; a rotor which is matched with the stator and is positioned in the housing, and the rotor sleeves the output shaft in a threaded fitting manner; and a brake unit, which is provided in the housing and is configured to brake the rotor and/or the output shaft during power off; and where one of the housing and the output shaft is connected to a joint component corresponding to each telescopic part, and the other one is connected to the main limb body.

A robot according to the embodiments of the present disclosure, including: a leg structure which adopts the robot limb structure according to the above-mentioned robot limb structure; a trunk structure which is positioned above-mentioned the leg structure, and is connected to a joint component at an upper end of the leg structure; and a base which is positioned below the leg structure, and is connected to a joint component at a lower end of the leg structure.

BRIEF DESCRIPTION OF DRAWINGS

The above-mentioned and/or additional aspects and advantages of the present disclosure will be apparent and easily understood from the description of the embodiments in conjunction with the accompanying drawings below, in which.

Figure 1:
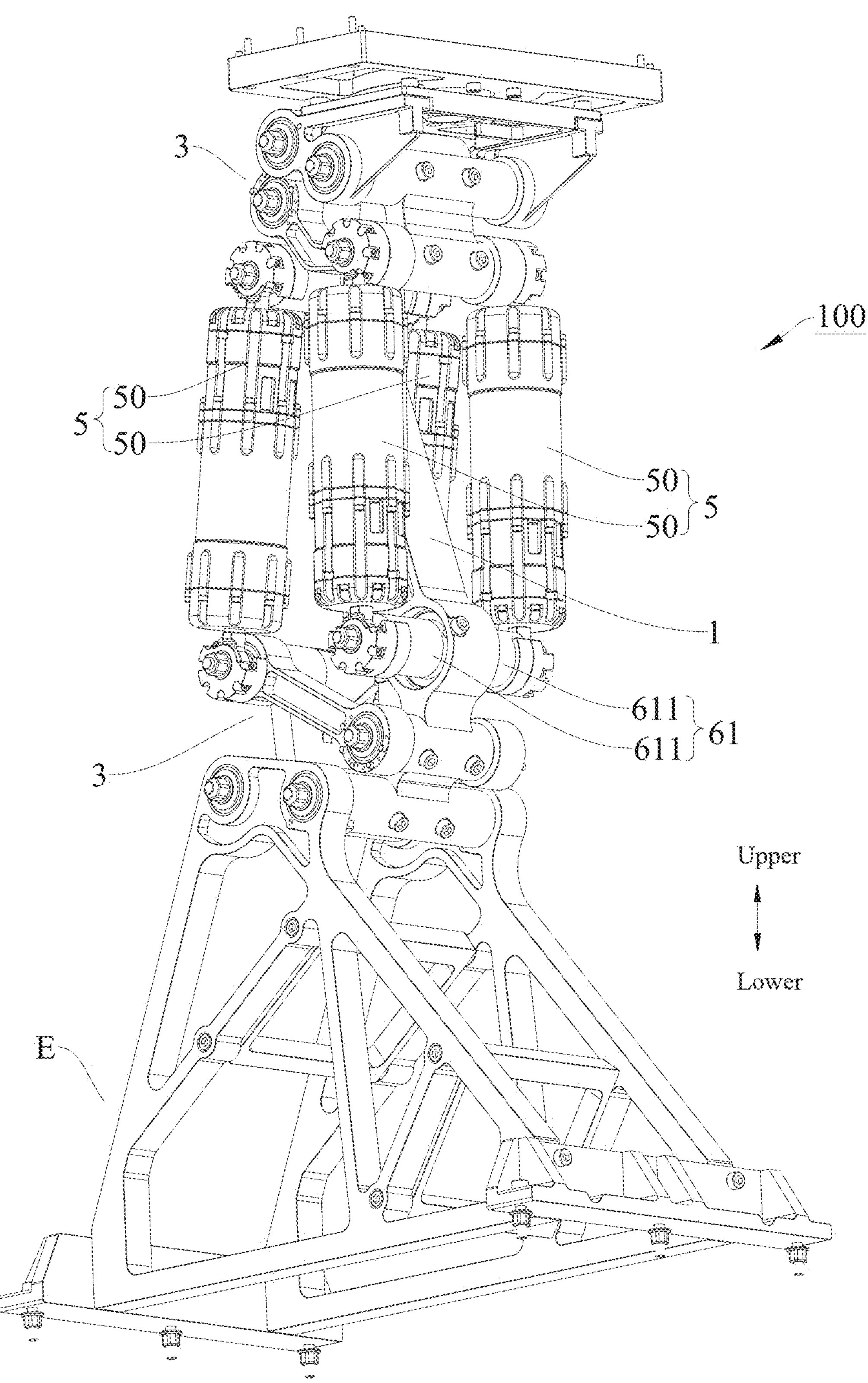
FIG. 1 is a three-dimensional view of a limb structure and a base in one direction in some embodiments.

REFERENCE NUMERALS robot 1000, head structure A, trunk structure B, arm structure C, leg structure D, base E, limb structure 100, main limb body 1, joint-connection part 11, first hinge point Q1, second hinge point Q2, third hinge point Q3, fourth hinge point Q4, main limb section 12, branch limb section 13, assembly barrel 131, short rod 132, assembling hole 14, first limiting hole 151, first limiting pin 152, second limiting hole 153, second limiting pin 154, reinforcing rib 16, joint component 3, first connecting rod 31, second connecting rod 32, third connecting rod 33, rotating rod 34, telescopic part 5, telescopic body 50, output shaft 51, stator 52, second excitation component 521, rotor 53, nut 531, first excitation component 532, brake unit 54, first brake member 541, second brake member 542, electromagnetic part 543, elastic member 544, sliding table 545, housing 55, angle detection unit 57, rotating sheet 571, supporting sheet 572, angle sensor 573, driver 58, connector 61, spherical hinge 611.

DETAILED DESCRIPTION

The embodiments of the present disclosure are described in detail below, and examples of the embodiments are shown in the accompanying drawings in which the same or similar designations from beginning to end indicate the same or similar elements or elements having the same or similar functions. The embodiments described below with reference to the accompanying drawings are illustrative and are intended to explain the present disclosure only and should not be construed as limiting the present disclosure.

In the description of the present disclosure, it is to be understood that the terms “center”, “length”, “thickness”, “upper”, “lower”, “top”, “bottom”, “inner”, “outer”, “axial”, “radial”, “circumferential”, etc., indicate orientations or positional relationships based on the orientations or positional relationships shown in the accompanying drawings and are for convenience and simplification of the description only, and do not indicate or imply that the device or element referred to must have a particular orientation, be constructed and operated in a particular orientation, Therefore, it cannot be construed as a limitation on the present disclosure. In addition, features that are defined as “first” and “second” may explicitly or implicitly include one or more of these features. In the description of the present disclosure, unless otherwise stated, “plurality” means two or more.

In the description of the present disclosure, it should be noted that, unless otherwise expressly specified and qualified, the terms “mounted”, “linked”, “connected” shall be understood broadly, for example, it may be fixedly connected, detachable or integrally connected; or it may be mechanically or electrically connected; or it may be directly linked or indirectly linked through an intermediate medium, or it may be a communication between two elements. For those of ordinary skill in the art, the specific meaning of the above-mentioned terms in the present disclosure can be understood on a case-by-case basis.

A robot limb structure 100 according to the embodiments of the present disclosure is described below with reference to FIG. 1 to FIG. 7.

Figure 2:
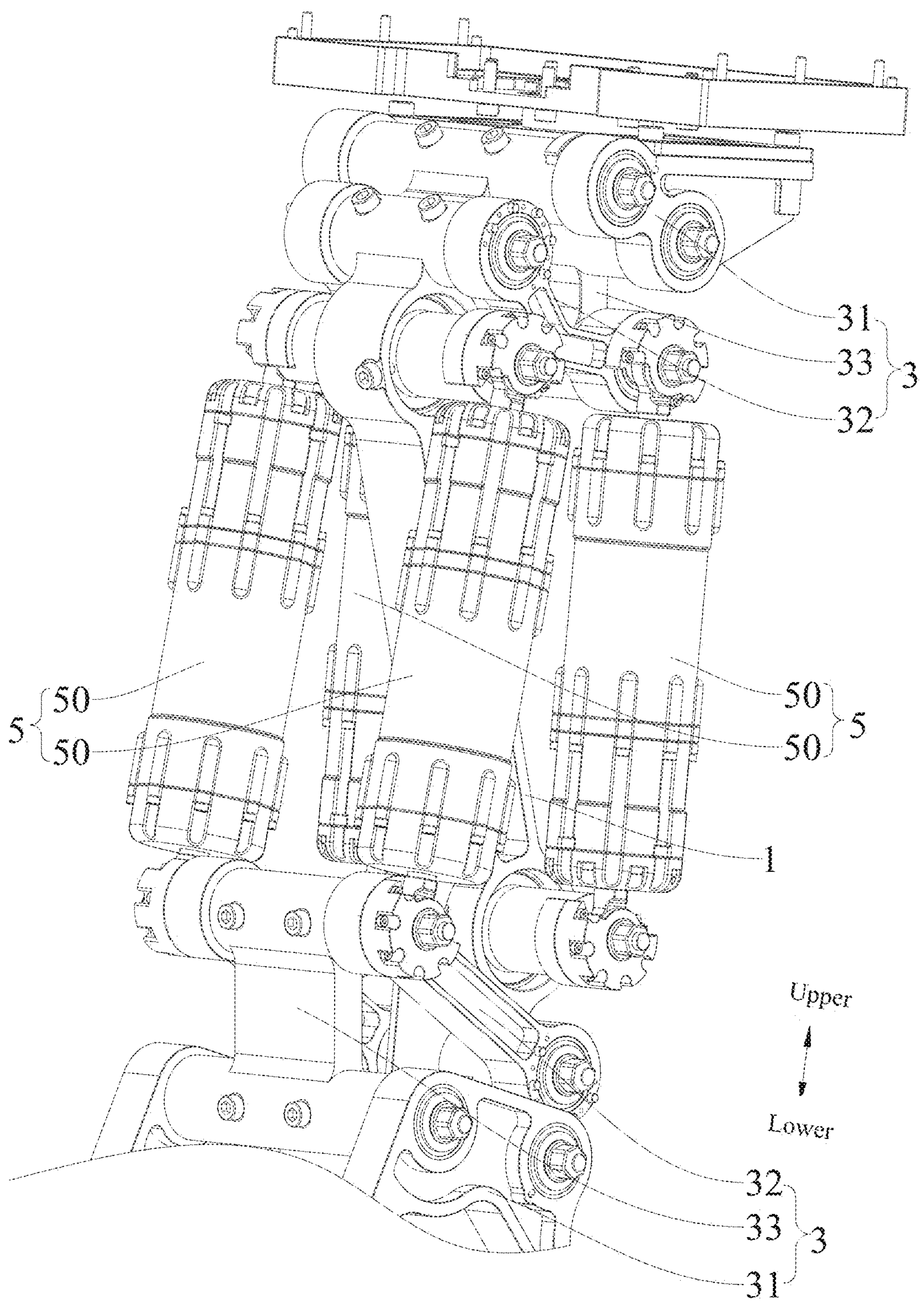
FIG. 2 is a three-dimensional view of a limb structure in another direction in some embodiments.
Figure 3:
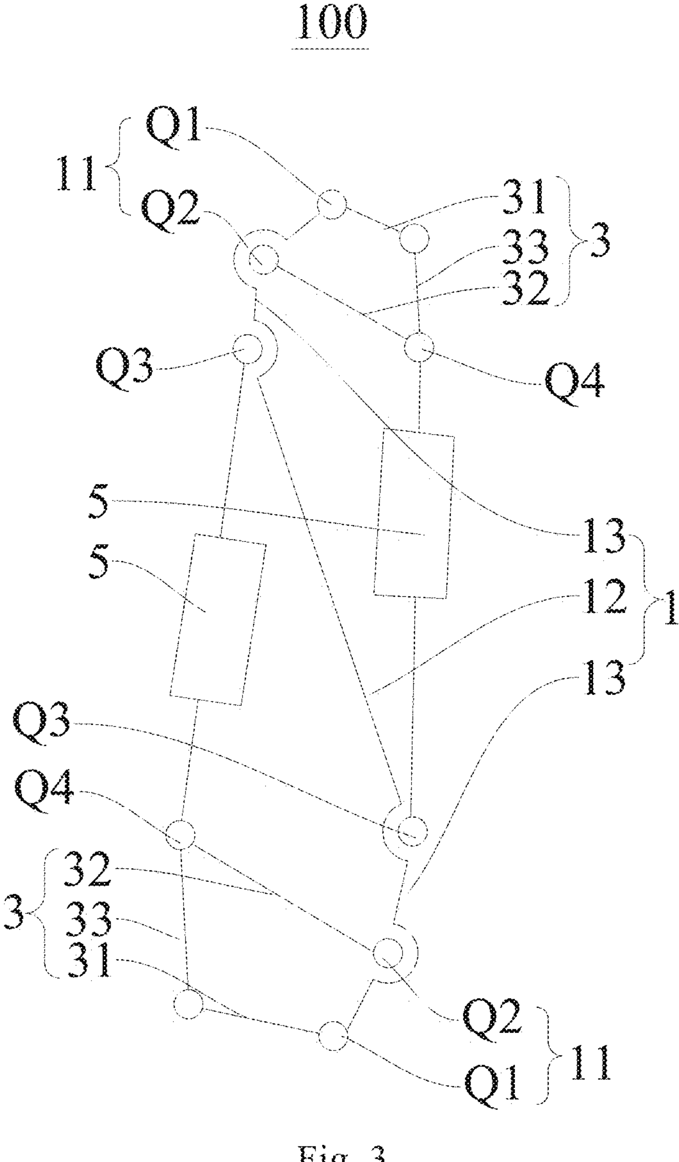
FIG. 3 is a schematic diagram of configuration of a limb structure in some embodiments of the present disclosure.

The robot limb structure 100 according to the embodiments of the present disclosure, as shown in FIG. 1 to FIG. 3, includes: a main limb body 1, two joint components 3 and two telescopic parts 5.

As shown in FIG. 3, joint-connection parts 11 are provided at two ends of the main limb body 1 respectively. The two joint components 3 are connected to the two joint-connection parts 11 respectively, and each joint component 3 form a connecting rod mechanism with the corresponding joint-connection part 11. The two telescopic parts 5 are provided corresponding to the two joint-connection parts 11, one end of each telescopic part 5 is hinged to the corresponding joint component 3, and the other end of each telescopic part 5 is hinged to the main limb body 1; and the length of each telescopic part 5 may be adjusted to drive the connected connecting rod mechanism to move.

Thus, the connecting rod mechanisms are formed at the two ends of the limb structure 100 through the cooperation of the joint-connection parts 11 of the main limb body 1 and the joint components 3, equivalently, a joint with controllable action is provided at each end of the limb structure 100, which can mimic a certain limb of a human body, such as the thigh, shank, arm, torso, and so on. Taking the limb structure 100 mimicking the thigh of the human body as an example, the joint at an upper end is equivalent to a hip joint, the joint at a lower end is equivalent to a knee joint, and the action of the joints at the two ends is controllable.

The two joints are driven to act by the adjustment of the length of the telescopic parts 5, and the length change amplitude of the telescopic parts 5 determines the action amplitude of the joints to a certain extent. The length direction of the telescopic parts 5 may be set to be consistent with the length direction of the main limb body 1. In the case that the main limb body 1 is long enough, the telescopic parts 5 can have a large enough length change adjustment amplitude range, so that a large enough action space is provided for each joint. In this way, the overall limb structure can be easily made into a relatively slender shape, which is easy to mimic.

Compared with related technology that the joints are provided as rotating members positioned at the end parts of limbs, the solution in the present disclosure that the joints are driven to act by the length adjustment of the telescopic parts 5 has the advantages that the main limb body 1, the joint components 3 and the telescopic parts 5 can form a triangular stable structure by means of the long rod shape of the telescopic parts 5, so that the support for the joints is improved by means of the main limb body 1, especially the impact on the joints and driving members can be reduced when the load changes, thus avoiding the concentration of driving parts at the joints, which may lead to stress concentration at the joints and a high risk of damage.

In some embodiments, each telescopic part 5 is formed by one telescopic body 50, so that the whole limb structure 100 can be flat and thin, and the limb structure is suitable for limb shapes needing flat and thin feeling.

In other embodiments, as shown in FIG. 1, at least one telescopic part 5 includes at least two telescopic bodies 50 which are parallel and consistent in length. The number of the telescopic bodies 50 is increased, whereby the energy output power of the connected joints can be increased, thus improving the bearing capacity of the joints in action.

In some specific embodiments, as shown in FIG. 1 and FIG. 2, each telescopic part 5 includes two telescopic bodies 50, the two telescopic bodies 50 are symmetrically provided on the two sides of the main limb body 1, and each telescopic body 50 is connected to the main limb body 1 through a connector 61. Thus, acting force generated by two telescopic bodies 50 in the telescopic process is generally balanced and the acting force generated on the main limb body 1 is generally balanced, whereby bending moment generated by the two telescopic bodies 50 on two sides of the main limb body 1 can be reduced, internal stress at the joints can be reduced, and the damage to the telescopic bodies 50 can be reduced.

Definitely, in the embodiments according to the present disclosure, the relationship between the telescopic bodies 50 and the main limb body 1 may be not limited to the above, for example, the main limb body 1 may be in a frame shape, main bodies of all the telescopic bodies 50 are provided in the frame. Or, at least two main limb bodies 1 are provided, and the telescopic bodies 50 are arranged between every two adjacent main limb bodies 1.

The connectors 61 are provided to transmit torque or force. The connectors 61 are provided with certain offset compensation capacity. The connectors 61 are provided to reduce vibration caused by mechanical transmission between the telescopic bodies 50 and the main limb body 1, and reduce impact peak loads. The connectors 61 may further have certain buffering and damping performance.

The type of the connectors 61 is not limited, and the connectors 61 may be a universal coupling and the like. In some specific embodiments of the solution according to the present disclosure, the connectors 61 are spherical hinges 611. Connecting the telescopic bodies 50 and the main limb body 1 with the spherical hinges 611 can ensure reliable force transmission. Moreover, the rotation performance of the spherical hinges 611 is consistent in all directions, enabling it to effectively transmit and bear various loads, and ensuring the stability and safety of the structure. Moreover, as standard components that has been maturely used in the market, the spherical hinges 611 are made of high-strength materials and are of a special structural design, so the bearing capacity of the spherical hinges 611 is greatly improved. In addition, the spherical hinges 611 can meet the requirements for large rotation angles and the requirements for shock resistance and reduction.

Figure 4:
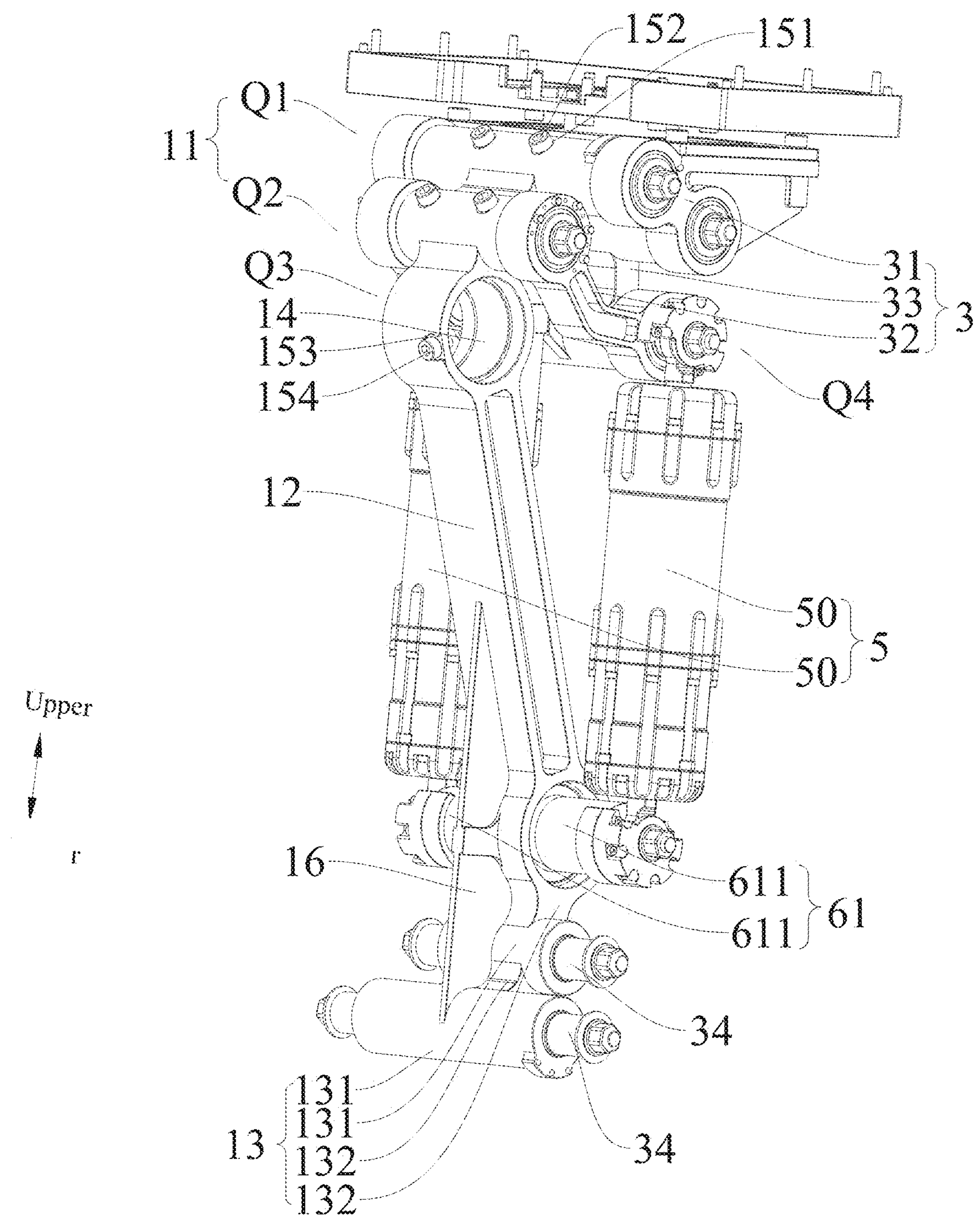
FIG. 4 is a three-dimensional diagram of components in hidden parts of the limb structure in some embodiments.
Figure 5:
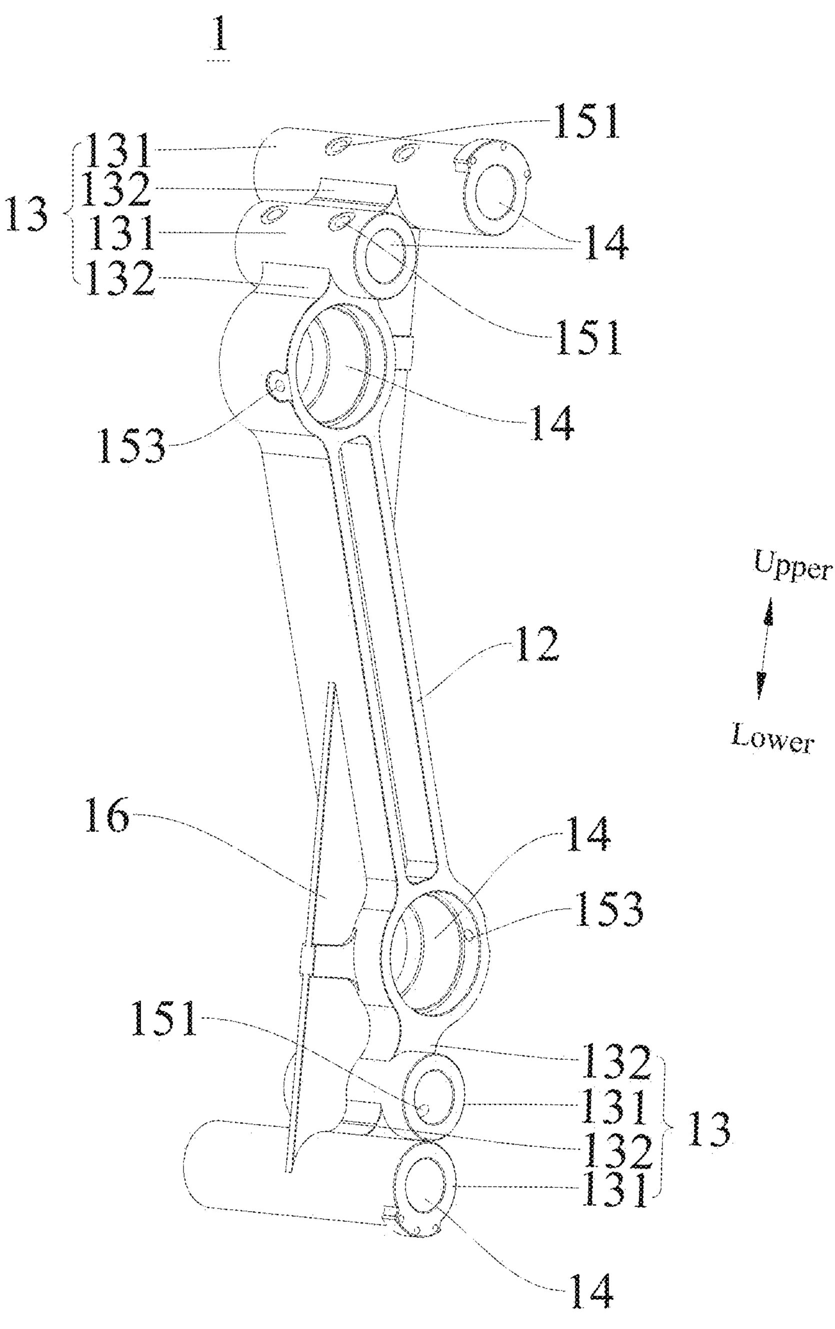
FIG. 5 is a three-dimensional view of a main limb body in some embodiments.

In some embodiments, as shown in FIG. 3, FIG. 4 and FIG. 5, each joint-connection part 11 includes a first hinge point Q1 and a second hinge point Q2 which are provided on the main limb body 1 at an interval, and a third hinge point Q3 is further provided on the main limb body 1.

Each joint component 3 includes: a first connecting rod 31, a second connecting rod 32 and a third connecting rod 33; one end of the first connecting rod 31 is connected to the first hinge point Q1; one end of the second connecting rod 32 is connected to the second hinge point Q2; two ends of the third connecting rod 33 are hinged to the first connecting rod 31 and the second connecting rod 32 respectively; a fourth hinge point Q4 is provided at a part in which the second connecting rod 32 and the third connecting rod 33 are hinged; and one end of each telescopic part 5 is connected to the fourth hinge point Q4, and the other end of each telescopic part 5 is connected to the third hinge point Q3.

That is, the second connecting rod 32, the telescopic part 5 and the main limb body 1 form a three-connecting rod mechanism in a stable triangle shape. In the case that the length of the telescopic part 5 changes, angle of the second connecting rod 32 relative to the main limb body 1 changes, and the angle is determined uniquely.

The first connecting rod 31, the second connecting rod 32, the third connecting rod 33 and the main limb body 1 form a four-connecting rod mechanism; after the length of the telescopic part 5 is determined, the angle of the second connecting rod 32 relative to the main limb body 1 is determined, and the shape of the four-connecting rod mechanism is also determined and unique. Thus, the uniquely-determined joint action can be obtained through length adjustment of the telescopic part 5.

By means of the solution that the three-connecting rod mechanism and the four-connecting rod mechanism are combined, the rod supporting acting force between the connecting rod mechanisms is high, and the number of needed rods is small, so the space for joint points is not large.

Definitely, in the embodiments of the present disclosure, the four-connecting rod mechanism may be replaced with other more complex connecting rod mechanisms according to actual use requirements. For example, a plurality of first connecting rods 31 may be arranged in parallel so that the joint loading capacity can be improved.

In some specific embodiments, as shown in FIG. 5, the main limb body 1 includes: a main limb section 12 and two branch limb sections 13; one end of each branch limb section 13 is connected to one of the two ends of the main limb section 12, and the other end of each branch limb section 13 is positioned on one of two opposite sides of the main limb section 12. One end of each telescopic part 5 is connected to the third hinge point Q3 adjacent to one branch limb section 13, and the other end of each telescopic part 5 is connected to the joint component 3 connected to the other branch limb section 13.

That is, as shown in FIG. 2, the branch limb section 13 at each end of the main limb section 12 is a hook, the bending directions of the two hooks are opposite, and therefore spaces defined by the two hooks may be connected to one joint component 3 respectively; after the telescopic parts 5 are connected, the installation spaces do not interfere with each other; the telescopic parts 5 do not interfere with each other during length adjustment, and therefore two joints can act respectively. After the telescopic parts 5 and the joint components 3 are connected, the whole limb structure 100 is uniform in distribution, and the situation that components at a certain position are too dense and the appearance is enlarged is avoided.

Specifically, the two ends of the main limb section 12 are each provided with an assembling hole 14 to form the third hinge points Q3, and each branch limb section 13 is provided with two assembling holes 14 to form the first hinge points Q1 and the second hinge points Q2 respectively. Therefore, the acting force at each hinge point can be transmitted into the main limb section 12 and the branch limb sections 13 during assembly, and the acting force can be dispersed to the whole main limb body 1. On one hand, stress concentration of the main limb body 1 at the hinge points is reduced, and on the other hand, assembly is convenient.

Specifically, as shown in FIG. 4, each joint component 3 includes two rotating rods 34, the two rotating rods 34 are assembled into two assembling holes 14 in the branch limb sections 13, and the first connecting rods 31 and the second connecting rods 32 are connected to the ends of the two rotating rods 34 respectively. The acting force borne by the first connecting rods 31 and the second connecting rods 32 can be transmitted to the branch limb sections 13 through the rotating rods 34, the rotating rods 34 can resist large bending moment, thus deformation can be reduced, and the force transmission smoothness can be improved.

Optionally, as shown in FIG. 5, a first limiting hole 151 is radially provided in each assembling hole 14 of the branch limb sections 13; as shown in FIG. 4, first limiting pins 152 are assembled at the first limiting holes 151 to limit the rotating rods 34. For example, annular grooves may be machined in peripheral surfaces of the rotating rods 34; and after the rotating rods 34 are assembled in the assembling holes 14, the first limiting pins 152 are mounted, and the ends of the first limiting pins 152 extend into the annular grooves. Thus, the rotating rods 34 may rotate freely, but cannot move axially. In some solutions, the rotating rods 34 may not rotate when being assembled in the assembling holes 14; and after the first connecting rods 31 and the second connecting rods 32 are connected to the rotating rods 34, the first connecting rods 31 and the second connecting rods 32 may rotate relative to the rotating rods 34. In this case, the first limiting pins 152 can limit the rotation and axial movement of the rotating rods 34.

Further optionally, as shown in FIG. 4, the telescopic parts 5 are connected to the main limb body 1 through the connectors 61, a second limiting hole 153 is radially formed in each assembling hole 14 in the main limb section 12; and as shown in FIG. 4, second limiting pins 154 are assembled in the second limiting holes 153 to limit the connectors 61. Thus, after the connectors 61 are assembled in the assembling holes 14, the connectors 61 can be prevented from falling off, and then the assembly reliability is improved.

In some specific embodiments, as shown in FIG. 4 and FIG. 5, the assembling holes 14 in the branch limb sections 13 are axially formed in a through manner; the rotating rods 34 are mounted at the assembling holes 14, and two ends of the rotating rods 34 stretch out of the assembling holes 14. Two ends of one rotating rod 34 are both connected to the first connecting rods 31, and two ends of the other rotating rod 34 are both connected to the second connecting rods 32. Thus, the first connecting rods 31 are equivalent to be in a plate shape or a net shape or a double-rod shape, and the structural strength can be remarkably improved. The second connecting rods 32 are equivalent to be in a plate shape or a net shape or a double-rod shape, and the structural strength can be remarkably improved.

Specifically, each branch limb section 13 includes two assembly barrels 131, each assembly barrel 131 defines one assembling hole 14, and the two assembly barrels 131 are connected through a short rod 132. Furthermore, two ends of the short rods 132 are in arc transition connection with the peripheral faces of the assembly barrels 131, and therefore the structural strength of the connecting parts is improved.

In some specific embodiments, as shown in FIG. 4 and FIG. 5, the assembling holes 14 in the main limb section 12 are axially formed in a through manner, and two spherical hinges 611 are mounted in the assembling holes 14 so as to be connected to telescopic bodies 50 correspondingly.

In some specific embodiments, as shown in FIG. 4, reinforcing rib 16 is arranged between the main limb section 12 and at least one branch limb section 13. The overall structural strength of the main limb body 1 can be improved through the design of the reinforcing rib 16. Particularly, in the case that the branch limb sections 13 are bent relative to the main limb section 12, the load at the bent parts can be reduced through the reinforcing rib 16, and the cracking probability of the bent parts is reduced.

Specifically, the reinforcing ribs 16 are in a sheet shape and are connected to the whole branch limb sections 13.

In some embodiments, as shown in FIG. 4, each telescopic part 5 includes a linear motor. The adopted linear motors are thin and long in overall appearance, and such arrangement is facilitated to reduce the occupied space.

Figure 6:
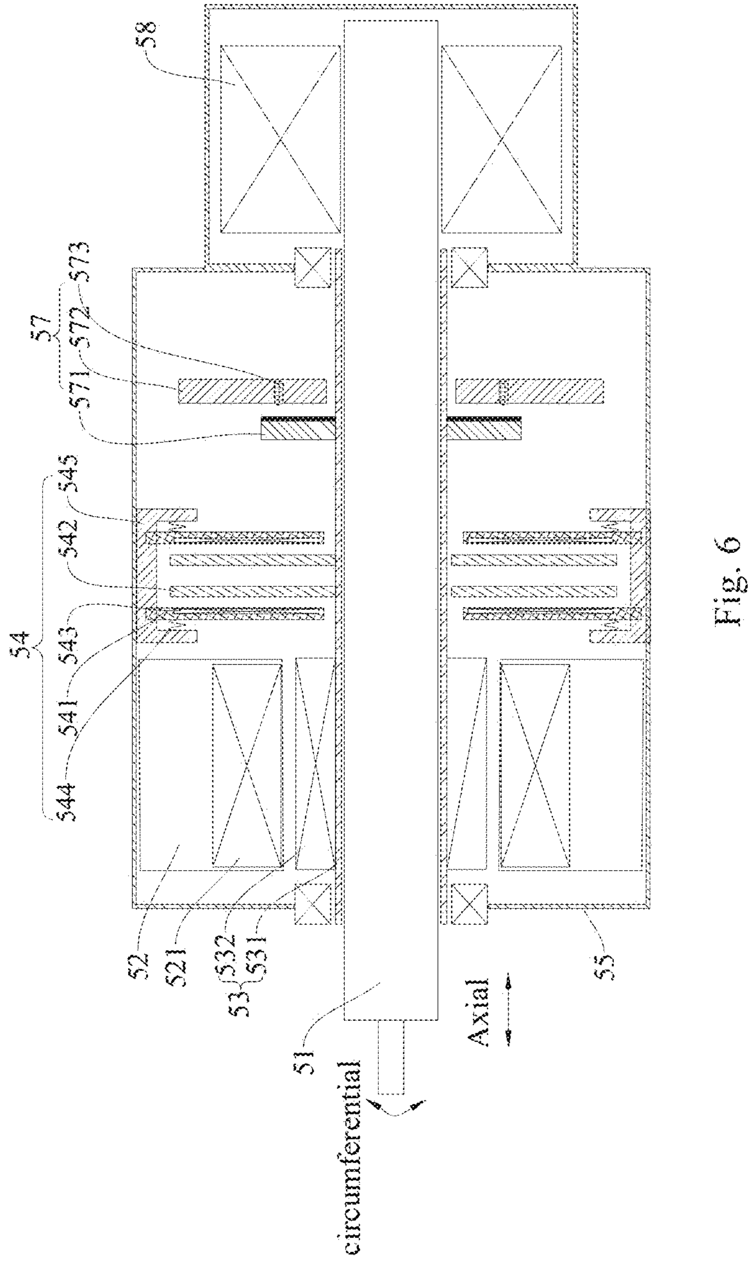
FIG. 6 is a structural schematic diagram of a linear motor according to some embodiments.
Figure 7:
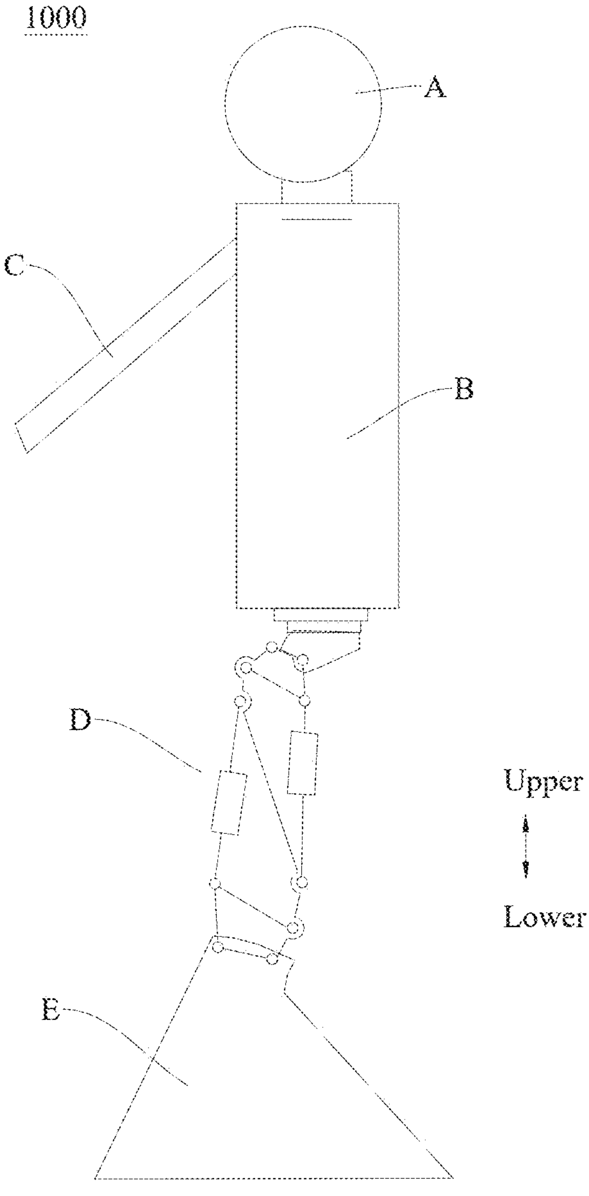
FIG. 7 is a structural diagram of a robot according to some embodiments.

Specifically, as shown in FIG. 6, each telescopic part 5 includes: a housing 55, an output shaft 51, a stator 52, a rotor 53 and a brake unit 54. The output shaft 51 is provided in the housing 55, and one end of the output shaft 51 extends out of the housing 55. The stator 52 is positioned in the housing 55 and sleeves the output shaft 51; the rotor 53 is matched with the stator 52 and is positioned in the housing 55; and the rotor 53 sleeves the output shaft 51 in a threaded fitting manner. The brake unit 54 is provided in the housing 55 and is configured to brake the rotor 53 and/or the output shaft 51 during power off. One of the housing 55 and the output shaft 51 is connected to the corresponding joint component 3, and the other one of the housing 55 and the output shaft 51 is connected to the main limb body 1.

Specifically, the rotors 53 are provided with first excitation components 532, the stators 52 are provided with second excitation components 521, and the first excitation components 532 and the second excitation components 521 are coupled. The rotors 53 are driven to rotate through electromagnetic force generated between the two excitation components and drive the output shafts 51 to move axially.

Generally, the stators 52 are fixed parts of the linear motors and include stator cores, and the second excitation components 521 include stator windings wound on the stator cores. The stator windings are connected to an AC power supply, and the stator windings can generate a rotating magnetic field when being powered on. The rotors 53 are rotating parts in the linear motors. The rotors 53 include rotor cores, and the first excitation components 532 may include permanent magnets embedded in the rotor cores or on the peripheries of the rotor cores, or may include rotor windings wound on the rotor cores. In the rotating magnetic field generated by the second excitation components 521 of the stators 52, the first excitation components 532 of the rotors 53 are excited to rotate, induced electromotive force is generated, and therefore the energy is converted into kinetic energy from electric energy.

In the embodiments of the present application, because the rotors 53 sleeve the output shafts 51 in a threaded fitting manner, the rotors 53 only rotate relative to the stators 52 and cannot axially move, and the output shafts 51 can be driven to move in the axial direction through an inclined face pressure of threads. Because the stators 52 are connected to the AC power supply, the direction of the rotating magnetic field generated under the change in the phase of the AV power supply changes, the rotating direction of the rotors 53 can be switched between a forward rotation and a reverse rotation, then the output shafts 51 can axially move in a bidirectional mode, and therefore the telescopic bodies 50 can be stretched and retracted.

Because the rotors 53 are in threaded fitting with the output shafts 51, compared with other driving modes, such driving mode that rotation is converted into linear movement is stable in movement, low in noise and large in output power. Moreover, the thread pitch parameters of the threads may be flexibly selected to achieve proper control precision. For example, in the case that the threads are single-start threads and the thread pitch is 1 mm, the linear movement distance of the output shafts 51 is 1 mm after the rotors 53 rotates 360°. That is, the linear movement distance of the output shafts 51 is 1/360 mm every time the rotors 53 rotate by 1°, and therefore the linear movement control precision of the output shafts 51 can be relatively high.

In the embodiments of the present disclosure, the output shafts 51 sleeve the brake units 54, and the brake units 54 are provided inside the linear motors instead of outside the linear motors, so the peripheral spaces of the output shafts 51 can be fully utilized for disposing the brake units 54.

Particularly, because the output shafts 51 have the length requirement in the axial direction, for example, in the case that a traditional lead screw-nut structure is adopted, the length is generally determined, and long-stroke lead screw nuts have enough length space to accommodate the stators 52, the rotors 53 and the brake units 54. Therefore, the peripheral circumferential spaces of the output shafts 51 are large, after the brake units 54 are disposed, the boundary dimension of the linear motors cannot be increased too much, and the overall length of the linear motors can be reduced as much as possible. Particularly, some brake units 54 are of a sheet type structure, the size of the linear motors provided with the brake units 54 can be equal to the size of the linear motors not provided with the brake units 54, such structure of the brake units 54 facilitates compact stacking of all components inside the linear motors, and the complete assembly function is achieved with high integration. The linear motors in the present disclosure are compact and small in size, and therefore the linear motors can conveniently adapt to different application scenarios and are convenient to mount and arrange.

In addition, because the brake units 54 sleeve the output shafts 51, in the case that the brake units 54 are started to brake the output shafts 51, the brake force of the brake units 54 may be directly applied to the rotors 53, or may be directly applied to the output shafts 51, or may also be applied to the rotors 53 and the output shafts 51 at the same time. Whether the brake force is applied to the rotors 53 or the output shafts 51, the output shafts 51 finally obtain circumferential holding force. A small holding force is needed for holding the output shafts 51 from the circumferential periphery, thus the braking to the output shafts 51 is stable, and the torque borne by the output shafts 51 is small.

The brake units 54 are provided with a power-off starting structure, the linear motors are kept in a status before power off, and therefore the connected joints are kept in the status before power off. Thus, action deformation, caused by external loads, of the joints is avoided, and the safety and reliability of the joints can be improved.

In some embodiments, as shown in FIG. 6, each brake unit 54 includes: a first brake member 541 and a second brake member 542. The first brake members 541 are connected to the stators 52, and the first brake member 541 may be directly connected to the stators 52 or may also be indirectly connected to the stators 52. The second brake members 542 are connected to the rotors 53, the second brake members 542 rotate along with the rotors 53, and the second brake members 542 may be directly connected to the rotors 53 or may also be indirectly connected to the rotors 53. The second brake members 542 are disposed close to the first brake members 541.

According to the above-mentioned arrangement, the first brake members 541 do not rotate relative to the stators 52, the second brake members 542 rotate along with the rotors 53; in the case that the brake units 54 are not started, the first brake members 541 and the second brake members 542 are separated and do not interfere with each other, and the output shafts 51 are driven to rotate by the rotation of the rotors 53. Meanwhile, in the case that the rotors 53 do not output drive force, the output shafts 51 may be driven by an external force to rotate.

After the brake units 54 are started, the first brake members 541 and the second brake members 542 hold tightly, a friction force generated between the first brake members 541 and the second brake members 542 enables the second brake members 542 not to rotate, and therefore the rotors 53 are held tightly and cannot rotate. The rotors 53 and the output shafts 51 are in threaded fitting, and therefore it is equivalent that the output shafts 51 are held tightly and cannot rotate. If the rotors 53 output the drive force, the output shafts 51 are braked by the brake units 54 and cannot move. If the rotors 53 do not output the drive force, but the external force is applied to the output shafts 51, the output shafts 51 are braked by the brake units 54 and cannot move.

In some specific embodiments, as shown in FIG. 6, at least one of the first brake member 541 and the second brake member 542 is provided with an electromagnetic part 543. The first brake members 541 and the second brake members 542 are constructed to be in a separated status when the electromagnetic part 543 is powered on, and the first brake members 541 and the second brake members 542 make contact and generate friction force for braking when the electromagnetic part 543 is powered off. In other words, the brake units 54 are started by powering off the electromagnetic part 543, and the electromagnetic part 543 may be powered off in the manner that the brake units 54 are actively powered off according to needs, so that the output shafts 51 are held tightly to be braked. The electromagnetic part 543 may also be passively powered off, then the output shafts 51 are held tightly to be braked, and thus the power-off self-locking function is achieved. Specifically, as shown in FIG. 6, the first brake members 541 and the second brake members 542 are annular sheets sleeving the output shafts 51.

In some specific embodiments, as shown in FIG. 6, at least two first brake members 541 are arranged along the output shaft 51 at intervals, and the second brake members 542 are positioned between the two adjacent first brake members 541, whereby the contact area between the first brake members 541 and the second brake members 542 can be increased, and the reliability of the brake performance is further improved.

At least one first brake member 541 is provided with the electromagnetic part 543, and every two adjacent first brake members 541 repel each other to be spaced from the second brake members 542 when powered on. Each brake unit 54 further includes an elastic part 544 configured to drive every two adjacent first brake members 541 to get close to each other so as to drive the first brake members 541 to move and contact with the second brake members 542 when the electromagnetic parts 543 are powered off. Therefore, in the case that the brake units 54 are not started, the elastic force of the elastic parts 544 is overcome through repulsive force generated by the electromagnetic parts 543, and thus the first brake members 541 and the second brake members 542 are separated from each other. After the brake units 54 are started, the repulsive force of the electromagnetic parts 543 disappears, and the elastic force of the elastic parts 544 drives the first brake members 541 and the second brake members 542 to be attached to each other to generate friction force. Through such arrangement, the starting mode of the brake units 54 is simple, and the error rate is low.

The first brake members 541 may be fixed relative to the stators 52, that is, the first brake members 541 cannot rotate or axially move relative to the stators 52. The first brake members 541 may also axially move relative to the stators 52, and thus the first brake members 541 are driven to axially move to switch the status through the repulsive force or the elastic force. The second brake members 542 may be fixed relative to the rotors 53, that is, the second brake members 542 cannot rotate or axially move relative to the rotors 53. The second brake members 542 may also axially move relative to the rotors 53, and thus the second brake members 542 are driven to axially move to switch the status through the repulsive force or the elastic force.

Specifically, each rotor 53 includes: a nut 531 and a first excitation component 532, and the first excitation component 532 is fixedly connected to the periphery of the nut 531. The output shafts 51 are lead screws matched with the nuts 531, and the outer sides of the nuts 531 are sleeved with the brake units 54. Thus, the output shafts 51 and the nuts 531 may be of a lead screw-nut structure commonly used in a traditional mechanical device; the production process of the lead screw-nut structure is mature, assembling gaps between the rotors 53 and the output shafts 51 can be small, the control precision is high, the transmitted axial force is large, and the reliability is high during low-speed and intermittent work.

The type of the lead screws is not limited here, and a common lead screw, a T-shaped lead screw, a ball screw, a roller lead screw and the like may be adopted.

Definitely, according to the embodiments of the present disclosure, the nuts 531 does not need to be disposed, and inner threads may be machined in the rotor cores of the rotors 53 to be matched with outer threads of the output shafts 51.

In some embodiments, as shown in FIG. 6, each linear motor further includes: an angle detection unit 57 for detecting the rotating positions of the rotors 53. Thus, accurate position and/or speed control can be achieved, and the controllability of the action of the linear motors is improved.

Specifically, the output shafts 51 are sleeved with the angle detection units 57, and thus the circumferential spaces on the peripheries of the output shafts 51 can be fully utilized; and the angle detection units 57 are positioned in the linear motors, so that external interference is small during detection, and the measurement precision is high.

Specifically, as shown in FIG. 6, each angle detection unit 57 includes: a rotating sheet 571, a supporting sheet 572 and an angle sensor 573. The rotating sheets 571 sleeve the output shafts 51 and are fixedly connected to the rotors 53; the supporting sheets 572 sleeve the output shafts 51 and are fixed relative to the stators 52; and the supporting sheets 572 are disposed close to the rotating sheets 571. The angle sensors 573 are disposed on the supporting sheets 572 and configured to sense and detect the positions of the rotating sheets 571. The main bodies of the angle detection units 57 are in a sheet shape, which facilitates compact stacking of the components in the linear motors.

In some embodiments, as shown in FIG. 6, each linear motor further includes: a driver 58. The drivers 58 are electrically connected to the second excitation components 521 and the brake units 54; and the drivers 58 are control cores of the linear motors and control starting, operation and braking of the linear motors. Specifically, the drivers 58 are annular and sleeve the outer sides of the output shafts 51. Therefore, the overall boundary dimension of the linear motors is reduced by further utilizing the peripheral spaces of the output shafts 51, whereby mounting and layout are convenient.

A robot 1000 according to the embodiments of the present disclosure is described below with reference to FIG. 1 to FIG. 7.

The robot 1000 according to the embodiments of the present disclosure includes: a leg structure D, a trunk structure B and a base E. The leg structure D adopts the robot limb structure 100 as described above, and the limb structure 100 is not elaborated here.

The trunk structure B is positioned above-mentioned the leg structure D and connected to the joint component 3 at the upper end of the leg structure D. The base E is positioned below the leg structure D and connected to the joint component 3 at the lower end of the leg structure D. Through such structure, the upper joints and the lower joints of the limb structure 100 may be controlled to realize the posture change adjustment of the leg structure D relative to the base E, or realize the posture change adjustment of the leg structure D relative to the trunk structure B, and more mimicking actions can be achieved; and the robot 1000 is simple in component structure, so the cost can be effectively controlled.

In some specific embodiments, the robot 1000 includes a head structure A, the trunk structure B, an arm structure C, the leg structure D and the base E; and the base E is positioned on the lowermost portion and serves as a pedestal.

According to the embodiment of the present disclosure, the structures and control operations of other components of the robot 1000, such as eye structures, are known to those skilled in the art, and are not elaborated here.

In the description of this specification, the description of the reference terms "embodiment", "example", etc. means that the specific features, structures, materials or characteristics described in conjunction with the embodiment or example are included in at least one embodiment or example of the present disclosure. In this specification, the schematic representation of the above-mentioned terms does not necessarily refer to the same embodiment or example. Moreover, the specific features, structures, materials or characteristics described may be combined in any one or more embodiments or examples in a suitable manner.

Although the embodiments of the present disclosure have been shown and described, it can be understood by those skilled in the art that various changes, modifications, substitutions and variations may be made to these embodiments without departing from the principles and purpose of the present disclosure, and the scope of the present disclosure is defined by the claims and their equivalents.

What is claimed is:

1. A robot limb structure, comprising:

a main limb body, wherein the main limb body is provided with two joint-connection parts at two ends, one of the two joint-connection parts is located at one of the two ends and the other of the two joint-connection parts is located at the other of the two ends;

two joint components, wherein one of the two joint components is connected to one of the two joint-connection parts and the other of the two joint components is connected to the other of the two joint-connection parts, and each joint component forms a connecting rod mechanism with a joint-connection part corresponding to each joint component; and two telescopic parts, which are provided corresponding to the two joint-connection parts, wherein one end of each telescopic part is hinged to a joint component of the two joint components, and the other end of each telescopic part is hinged to the main limb body, and a length of each telescopic part is adjustable so as to drive a connecting rod mechanism connected to each telescopic part to move, wherein each joint-connection part of the two joint-connection parts comprises a first hinge point and a second hinge point which are provided on the main limb body at an interval, and a third hinge point is further provided on the main limb body;

wherein each joint component comprises: a first connecting rod, a second connecting rod, and a third connecting rod; one end of the first connecting rod is connected to the first hinge point, one end of the second connecting rod is connected to the second hinge point, one of two ends of the third connecting rod is hinged to the first connecting rod and the other end of the two ends of the third connecting rod is hinged to the second connecting rod; a point where the second connecting rod and the third connecting rod are hinged is a fourth hinge point; and one end of a telescopic part corresponding to each joint-connection part is connected to the fourth hinge point, and the other end of the telescopic part is connected to the third hinge point.

2. The robot limb structure according to claim 1, wherein at least one of the two telescopic parts comprises at least two telescopic bodies which are parallel and consistent in length.

3. The robot limb structure according to claim 2, wherein each telescopic part comprises two telescopic bodies which are symmetrically provided on two sides of the main limb body, and each of the two telescopic bodies is connected to the main limb body through a connector.

4. The robot limb structure according to claim 3, wherein the connector is a spherical hinge.

5. The robot limb structure according to claim 1, wherein the main limb body comprises:

a main limb section, wherein each of the two ends of the main limb section is provided with an assembling hole to form the third hinge point;

two branch limb sections, wherein first ends of the two branch limb sections are connected to the two ends of the main limb section, second ends of the two branch limb sections are positioned on two opposite sides of the main limb section, each branch limb section of the two branch limb sections is provided with two assembling holes, one of the two assembling holes forms the first hinge point and the other of the two assembling holes forms the second hinge point; and wherein one end of each telescopic part is connected to the third hinge point adjacent to one branch limb section of the two branch limb sections, and the other end of each telescopic part is connected to a joint component connected to the other branch limb section of the two branch limb sections.

6. The robot limb structure according to claim 5, wherein each joint component comprises two rotating rods; the two rotating rods are assembled in the two assembling holes of each branch limb section; the first connecting rod is connected to an end of one of the two rotating rods and the second connecting rod is connected to an end of the other of the two rotating rods.

7. The robot limb structure according to claim 6, wherein a first limiting hole is radially provided in each assembling hole of each branch limb section; and a first limiting pin is assembled at the first limiting hole to limit a rotating rod in each assembling hole.

8. The robot limb structure according to claim 5, wherein a reinforcing rib is arranged between the main limb section and at least one of the two branch limb sections.

9. The robot limb structure according to claim 1, wherein each telescopic part comprises a linear motor, and the linear motor comprises:

a housing;

an output shaft which is provided in the housing, wherein one end of the output shaft extends out of the housing;

a stator which is positioned in the housing and sleeves the output shaft;

a rotor which is matched with the stator and is positioned in the housing, and the rotor sleeves the output shaft in a threaded fitting manner; and a brake unit, which is provided in the housing and is configured to brake the rotor, or brake the output shaft, or brake the rotor and the output shaft during power off; and wherein one of the housing and the output shaft is connected to a joint component corresponding to each telescopic part, and the other one is connected to the main limb body.

10. A robot, comprising:

a leg structure which adopts a robot limb structure;

a trunk structure which is positioned above the leg structure, and is connected to a joint component at an upper end of the leg structure; and a base which is positioned below the leg structure, and is connected to a joint component at a lower end of the leg structure, wherein the robot limb structure comprises:

a main limb body, wherein the main limb body is provided with two joint-connection parts at two ends, one of the two joint-connection parts is located at one of the two ends and the other of the two joint-connection parts is located at the other of the two ends;

two joint components, wherein one of the two joint components is connected to one of the two joint-connection parts and the other of the two joint components is connected to the other of the two joint-connection parts, and each joint component forms a connecting rod mechanism with a joint-connection part corresponding to each joint component; and two telescopic parts, which are provided corresponding to the two joint-connection parts, wherein one end of each telescopic part is hinged to a joint component of the two joint components, and the other end of each telescopic part is hinged to the main limb body, and a length of each telescopic part is adjustable so as to drive a connecting rod mechanism connected to each telescopic part to move, wherein each joint-connection part of the two joint-connection parts comprises a first hinge point and a second hinge point which are provided on the main limb body at an interval, and a third hinge point is further provided on the main limb body;

wherein each joint component comprises: a first connecting rod, a second connecting rod, and a third connecting rod; one end of the first connecting rod is connected to the first hinge point, one end of the second connecting rod is connected to the second hinge point, one of two ends of the third connecting rod is hinged to the first connecting rod and the other end of the two ends of the third connecting rod is hinged to the second connecting rod; a point where the second connecting rod and the third connecting rod are hinged is a fourth hinge point; and one end of a telescopic part corresponding to each joint-connection part is connected to the fourth hinge point, and the other end of the telescopic part is connected to the third hinge point.

11. The robot according to claim 10, wherein at least one of the two telescopic parts comprises at least two telescopic bodies which are parallel and consistent in length.

12. The robot according to claim 11, wherein each telescopic part comprises two telescopic bodies which are symmetrically provided on two sides of the main limb body, and each of the two telescopic bodies is connected to the main limb body through a connector.

13. The robot according to claim 12, wherein the connector is a spherical hinge.

14. The robot according to claim 10, wherein the main limb body comprises:

a main limb section, wherein each of the two ends of the main limb section is provided with an assembling hole to form the third hinge point;

two branch limb sections, wherein first ends of the two branch limb sections are connected to the two ends of the main limb section, second ends of the two branch limb sections are positioned on two opposite sides of the main limb section, each branch limb section of the two branch limb sections is provided with two assembling holes, one of the two assembling holes forms the first hinge point and the other of the two assembling holes forms the second hinge point; and wherein one end of each telescopic part is connected to the third hinge point adjacent to one branch limb section of the two branch limb sections, and the other end of each telescopic part is connected to a joint component connected to the other branch limb section of the two branch limb sections.

15. The robot according to claim 14, wherein each joint component comprises two rotating rods; the two rotating rods are assembled in the two assembling holes of each branch limb section; the first connecting rod is connected to an end of one of the two rotating rods and the second connecting rod is connected to an end of the other of the two rotating rods.

16. The robot according to claim 15, wherein a first limiting hole is radially provided in each assembling hole of each branch limb section; and a first limiting pin is assembled at the first limiting hole to limit a rotating rod in each assembling hole.

17. The robot according to claim 14, wherein a reinforcing rib is arranged between the main limb section and at least one of the two branch limb sections.

18. The robot according to claim 10, wherein each telescopic part comprises a linear motor, and the linear motor comprises:

a housing;

an output shaft which is provided in the housing, wherein one end of the output shaft extends out of the housing;

a stator which is positioned in the housing and sleeves the output shaft;

a rotor which is matched with the stator and is positioned in the housing, and the rotor sleeves the output shaft in a threaded fitting manner; and a brake unit, which is provided in the housing and is configured to brake the rotor, or brake the output shaft, or brake the rotor and the output shaft during power off; and wherein one of the housing and the output shaft is connected to a joint component corresponding to each telescopic part, and the other one is connected to the main limb body.

* * * * *